US006971411B1

(12) United States Patent
Draper

(10) Patent No.: US 6,971,411 B1
(45) Date of Patent: Dec. 6, 2005

(54) TRAPPED GAS REMOVAL IN LIQUID GAS ACCUMULATOR

(75) Inventor: Don R. Draper, Chanhassen, MN (US)

(73) Assignee: Eaton Corporation, Cleveland, OH (US)

( * ) Notice: Subject to any disclaimer, the term of this patent is extended or adjusted under 35 U.S.C. 154(b) by 0 days.

(21) Appl. No.: 11/101,904

(22) Filed: Apr. 8, 2005

Related U.S. Application Data

(63) Continuation-in-part of application No. 10/752,209, filed on Jan. 6, 2004, now abandoned.

(51) Int. Cl.[7] .................................................. F16L 55/04

(52) U.S. Cl. .......................... 138/30; 138/26; 220/721; 220/530

(58) Field of Search ............................. 138/30, 26, 31; 220/721, 530, 4, 12, 581

(56) References Cited

U.S. PATENT DOCUMENTS 3,368,586 A * 2/1968 French et al. ................. 138/30
3,907,000 A * 9/1975 Carr ............................ 138/30
4,032,265 A * 6/1977 Miller ......................... 417/540
4,328,836 A * 5/1982 Petrie ........................... 138/30
5,427,152 A * 6/1995 Weber .......................... 138/30
5,520,208 A * 5/1996 Schneider ................... 137/207
5,944,217 A * 8/1999 Baena ......................... 220/723
2003/0111124 A1 * 6/2003 Gray, Jr. ...................... 138/30

* cited by examiner

*Primary Examiner*—Patrick Brinson
(74) *Attorney, Agent, or Firm*—L. J. Kasper

(57) ABSTRACT

A hydraulic accumulator of the liquid-gas type, comprising a housing (11) defining a chamber (11C), a gas port (30) and a liquid port (19). A gas charging valve (31) is disposed in the gas port (30) to control admission of high pressure gas. A semi-permeable separator (35) is disposed within the housing (11) to separate the internal chamber (11C) into a gas chamber (33) in communication with the gas port (30), and a liquid chamber (21) in communication with the liquid port. A means (41) is within the liquid chamber for collecting gas which passes from the gas chamber (33), through the semi-permeable separator, and into the liquid chamber. Included is a conduit (45) having one end (45*a*) in communication with the gas collecting means (41), and another end (45*b*) operably associated with the housing (11,27) to communicate gas from the collecting means (41) out of the liquid chamber.

12 Claims, 8 Drawing Sheets

TRAPPED GAS REMOVAL IN LIQUID GAS ACCUMULATOR

CROSS-REFERENCE TO RELATED APPLICATIONS

This application is a continuation-in-part (CIP) of application U.S. Ser. No. 10/752,209, filed Jan. 6, 2004 now abandoned, in the name of Don R. Draper for a "Trapped Gas Removal In Liquid Gas Accumulator".

BACKGROUND OF THE DISCLOSURE

The present invention relates to hydraulic accumulators of the liquid-gas type, and more particularly, to such accumulators of the type having a separator between the gas chamber and the liquid chamber, wherein the separator is at least somewhat permeable with respect to the gas.

Liquid-gas accumulators, of the type to which the present invention relates, are now generally well known to those skilled in the art, an example of such an accumulator being shown in U.S. Pat. No. 5,520,208, incorporated herein by reference.

A typical liquid-gas hydraulic accumulator is used as a hydraulic energy storage device, wherein the accumulator may be "pumped up" with hydraulic fluid (the "liquid") by displacing the gas volume with hydraulic fluid. The gas pressure within the accumulator rises, in accordance with the physical properties of the gas being used, and is approximately equal to the pressure of the liquid within the accumulator. Subsequently, when hydraulic pressure is required somewhere in the hydraulic circuit with which the accumulator is associated, a control device (such as a valve) will open, thus releasing the stored hydraulic energy, to provide pressurized flow within the circuit.

In the typical hydraulic accumulator of the type to which the present invention relates, there is a rigid outer shell (or "housing") defining an internal chamber, and some sort of separator is disposed within the chamber, dividing it into a liquid chamber and a gas chamber. As is also typical, the liquid chamber is in communication with the external hydraulic circuit by means of a hydraulic port and conduit, which may or may not contain a valve assembly, while the gas chamber is able to receive high pressure gas from a source of pressurized gas, through a gas charging valve. Typically, the gas is some form of a relatively inert gas, such as a nitrogen gas, although it should be understood that the present invention is not limited to the use of any particular type of gas, or to any particular type of hydraulic valve or gas valve, or even to the presence of either of such valves.

In the conventional hydraulic accumulator of the liquid-gas type, the separator between the liquid chamber and the gas chamber may comprise a piston (sealed by an elastomeric sealing ring), or may comprise some sort of bellows arrangement, or any one of a number of other separator configurations, which are well known in the accumulator art. However, most frequently, the separator comprises an elastomeric bladder comprising any one of a number of suitable bladder materials known in the art, such as nitrile rubber. Typically, the materials used for such bladders are permeable, or at least "semi-permeable", i.e., the material does, over a period of time, permit some of the nitrogen gas to pass through the bladder material, into the adjacent liquid chamber.

The above-described problem of gas permeation through the bladder is more likely to occur in a relatively high pressure accumulator, i.e., one in which the maximum pressure of the liquid is in excess of 3000 or 4000 psi. or more, but such gas permeation also occurs, to a lesser extent, in low pressure accumulators. As is well known in the accumulator art, the gas permeation rate is a function of, among other factors, the gas pressure. In such liquid-gas accumulators, any gas which permeates through the bladder will typically remain in solution within the pressurized liquid. However, at some point, the high pressure liquid containing the nitrogen gas will flow to a relatively low pressure portion of the hydraulic circuit, at which point the nitrogen gas will be able (because of the lower pressure on the liquid) to form gas bubbles within the circuit. As is well known to those skilled in the hydraulic art, the presence of air or gas bubbles within a hydraulic circuit can result in noisy operation of various hydraulic components, and can cause damage to exposed surfaces of various hydraulic components (through a process known as "cavitation"), and eventually, can result in reduced performance of, or failure of such components.

BRIEF SUMMARY OF THE INVENTION

Accordingly, it is an object of the present invention to provide an improved hydraulic accumulator of the liquid-gas type which is able to minimize the damage caused within its associated hydraulic circuit by gas bubbles, resulting from permeation of the pressurized gas through the permeable separator.

It is a more specific object of the present invention to provide an improved hydraulic accumulator which is able to achieve the above-stated object by receiving the gas which permeates through the separator, and communicating it to a location external to the accumulator.

The above and other objects of the invention are accomplished by the provision of an improved hydraulic accumulator of the liquid-gas type, comprising a rigid housing defining an internal chamber and a gas port and a liquid port. A gas charging valve is disposed in the gas port to control the admission of high pressure gas. A deformable, semi-permeable separator is disposed within the housing to separate the internal chamber into a gas chamber in communication with the gas port, and a liquid chamber in communication with the liquid port.

The improved hydraulic accumulator is characterized by means disposed within the liquid chamber for receiving and collecting gas which passes from the gas chamber through the semi-permeable separator into the liquid chamber. A conduit means has one end in fluid communication with the gas collecting means, and another end operably associated with the housing to communicate gas from the gas collecting means out of the liquid chamber.

In accordance with a more limited aspect of the invention, the conduit means may comprise the rigid housing being formed from a porous filament material which is semi-permeable with respect to the gas.

DETAILED DESCRIPTION OF THE PREFERRED EMBODIMENT

Figure 1:
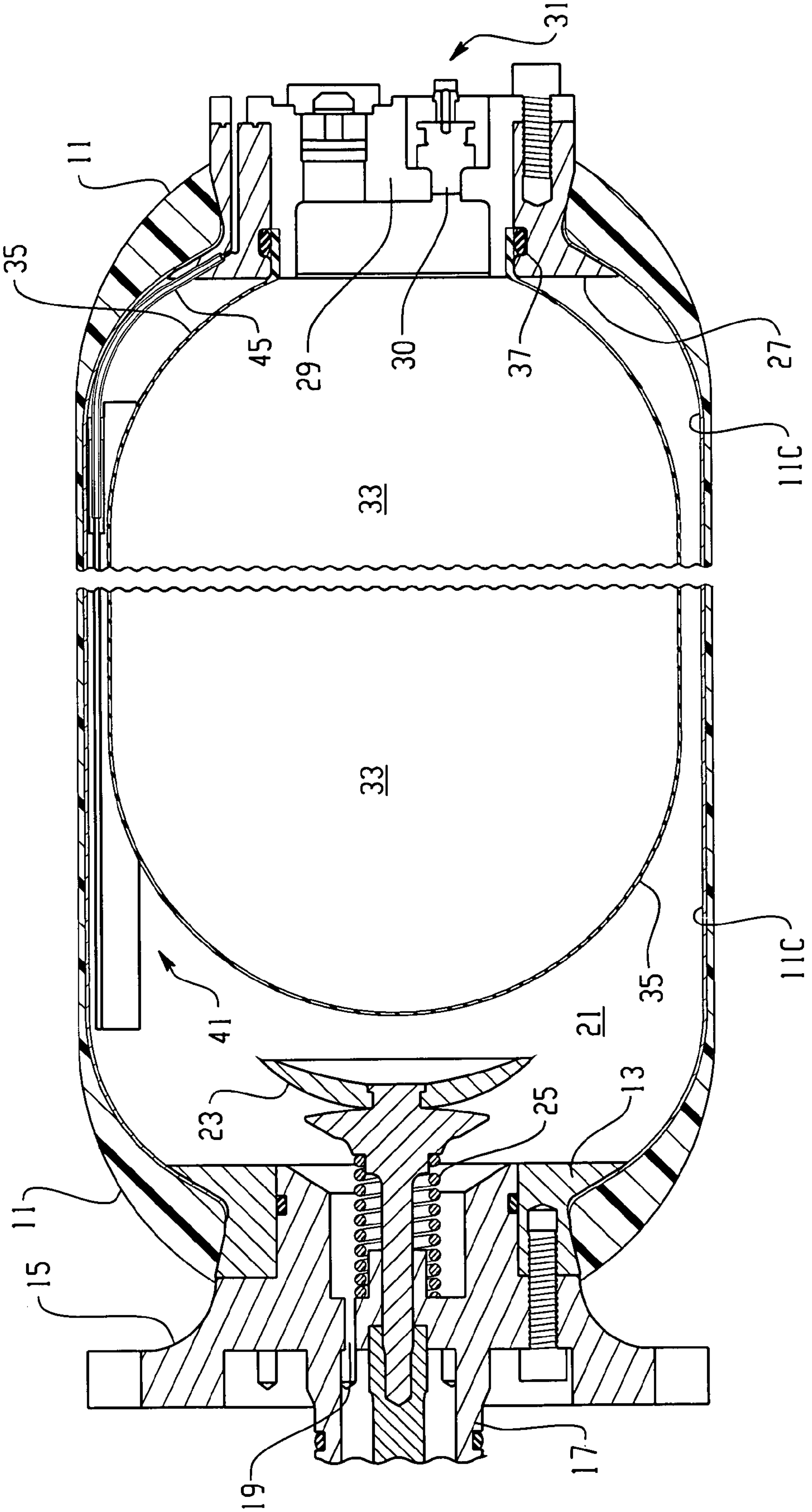
FIG. 1 is a fragmentary, broken-away axial cross-section of a hydraulic accumulator utilizing the present invention.

Referring now to the drawings, which are not intended to limit the invention, FIG. 1 is a fragmentary, broken-away, axial cross-section of a typical hydraulic accumulator, modified to include the present invention. The accumulator includes a housing 11, defining an internal chamber 11C. The housing 11 may be of any suitable configuration, such as spherical, but is shown herein as being cylindrical and horizontally elongated. By way of example only, an embodiment of an accumulator being developed by the assignee of the present invention includes a housing which is approximately ten inches in diameter, and approximately forty inches long. In one hydraulic system being developed by the assignee of the present invention, both a high pressure accumulator and a low pressure accumulator are included in the system. In that particular system, and by way of example only, the present invention is included as part of the low pressure accumulator.

Disposed within an opening formed at the left end of the housing 11 is an oil port ring 13, and bolted to the ring 13 is a mounting flange member 15, by means of which the accumulator may, by way of example only, be bolted to a manifold block, or to some other type of support structure. Disposed within the ring 13 and flange member 15 is a sleeve 17 which defines a fluid passage 19 (also referred to hereinafter as a “liquid port”), providing fluid communication between the external hydraulic circuit (not shown) and a fluid (liquid) chamber 21 disposed within the housing 11.

The sleeve 17 supports, for reciprocable movement therein, a valve element 23 which, as is well known to those skilled in the accumulator art, is biased by a spring 25 toward the open position of the valve element 23, as shown in FIG. 1. The operation of the valve element 23, and its interaction with the bladder (which will be introduced and described subsequently), is well known to those skilled in the art, is beyond the scope of the present invention, and therefore, will not be described further herein. It should be understood by those skilled in the art that the present invention is not limited to any particular type or configuration of fluid port and valve arrangement. All that is essential to the present invention is that the accumulator include some suitable arrangement for communicating pressurized fluid between the external hydraulic circuit and the fluid chamber 21.

Referring still primarily to FIG. 1, disposed within a right-hand, open end of the housing 11 is a gas port ring 27 (which is at times hereinafter considered, and referred to, as part of the “housing”), and bolted to the gas port ring 27 is a cap member 29. The cap member 29 defines a gas port 30, and disposed within the gas port 30 is a gas charging valve assembly 31, by means of which pressurized gas may be communicated from an external source of pressurized gas into a gas chamber 33 disposed within a bladder 35, in a manner generally well known to those skilled in the art. Typically, and by way of example only, the bladder 35 is molded, or formed by some other suitable means, such that, in the presence of pressurized gas within the gas chamber 33 (and in the absence of substantial hydraulic pressure in the fluid chamber 21), the overall configuration of the bladder 35 will conform generally to that of the housing 11, as it is represented in FIG. 1. As is shown only in FIG. 1, the bladder 35 includes, at its rightward end, an enlarged bead 37 which is retained between the gas port ring 27 and the cap member 29.

The accumulator is illustrated in FIG. 1 as being horizontally oriented, with the fluid valve element 23 being disposed at one axial end thereof, and the gas charging valve assembly 31 being disposed at the other axial end thereof. However, those skilled in the art will understand that, if the accumulator were to be oriented vertically, rather than as shown in FIG. 1, there could be provided an annular (rather than elongated) version of the gas receiver and collector of the present invention, and it could be disposed under the gas port ring 27. Therefore, although the present invention would probably be most effective with the accumulator in the horizontal position shown in FIG. 1, it should be clear that neither configuration nor orientation comprise essential features of the invention.

Figure 2:
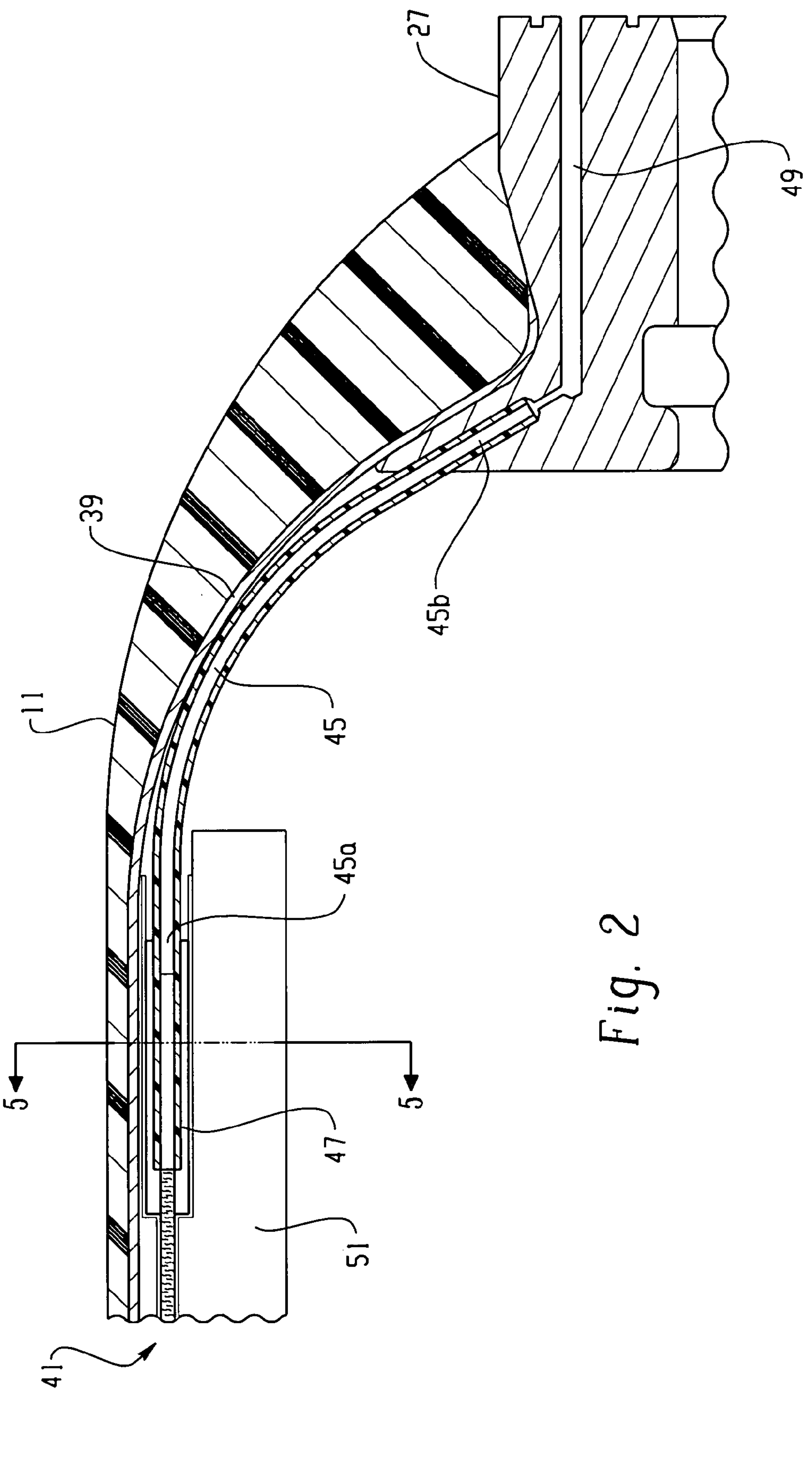
FIG. 2 is an enlarged, fragmentary axial cross-section, similar to FIG. 1, illustrating the gas collecting means of the present invention within the accumulator housing.

Referring now to FIG. 2, in conjunction with FIG. 1, it may be seen that there is preferably a liner 39 (shown also in FIG. 5) disposed against the interior surface of the housing 11, for reasons which are now generally well understood in the accumulator art, and which bear no relationship to the present invention. By way of example only, the preferred embodiment of the present invention includes the liner 39 because the housing 11 comprises a filament wound (or fiber-reinforced) polymeric housing which, in the absence of the liner 39, could be sufficiently porous to permit the flow therethrough of a small amount of the hydraulic fluid contained in the fluid chamber 21.

Figure 5:
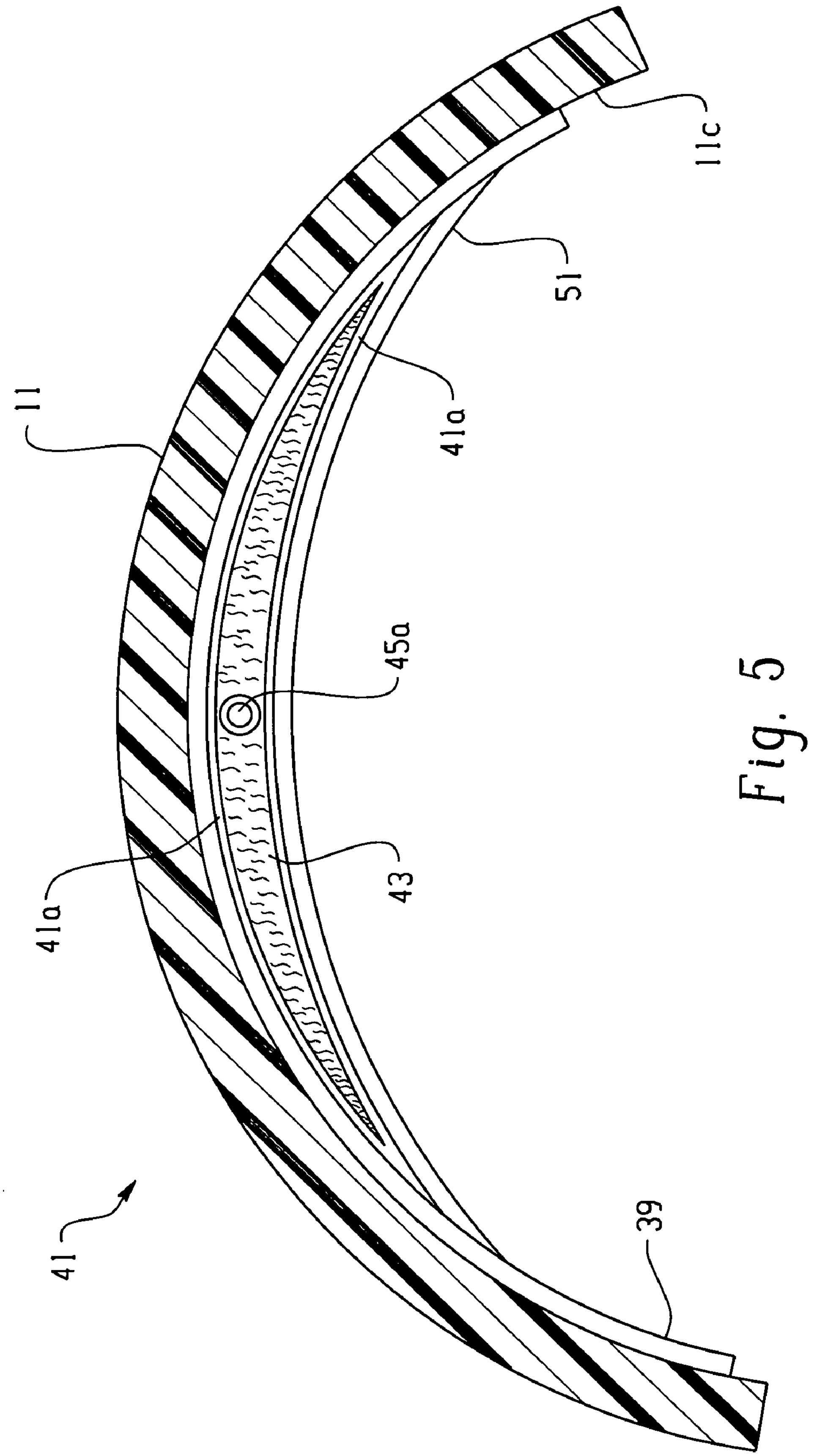
FIG. 5 is a transverse cross-section through the gas collecting means of the present invention, taken on line 5—5 of FIG. 2.

Referring still primarily to FIG. 2, the present invention provides a gas receiving and/or collecting assembly, generally designated 41, a portion of which may also be referred to hereinafter as a “transfer membrane”, for reasons which will become apparent to those skilled in the art from a reading and understanding of the rest of the specification. Preferably, with the accumulator having its axis of elongation oriented horizontally, the gas collecting assembly 41 of the primary embodiment would be disposed at or near the “top” of the internal chamber (fluid chamber 21) defined by the housing 11, as is shown in FIGS. 1, 2 and 5. It is preferable, for reasons which will become apparent subsequently, for the gas collecting assembly 41 to extend over a major portion of the entire axial extent of the accumulator, although it should be understood that such is not essential to the invention, except as is specifically otherwise noted in the claims. For example, in the subject embodiment, with the overall accumulator length being about forty inches, as was mentioned previously, the axial length of the gas collecting assembly 41 is about thirty inches.

Referring now primarily to FIGS. 2 through 5, the gas collecting assembly 41 will be described in greater detail. The gas collecting assembly 41 includes an internal layer of transfer fabric 43 which would preferably comprise an open-weave fabric, or felt, or open-cell foam, or any other suitable fabric or foam-type material which would not be readily degraded by the particular type of gas being used as the charging gas in the gas chamber 33 of the accumulator. However, the transfer fabric 43 must still allow the passage of the gas (nitrogen or other type of gas) through the body of the fabric. The primary function of the transfer fabric 43 is to allow movement of the nitrogen gas which has penetrated to the inside of the gas collecting assembly 41. The gas collected within the assembly 41 is the gas which has permeated through the bladder 35, and has risen through the fluid contained within the fluid chamber 21. By way of example only, the layer of transfer fabric 43 comprises, over most of the axial length of the assembly 41, a true "layer", approximately as shown in the left-hand portion of FIG. 4 and in FIG. 5.

The gas collecting assembly 41 further includes an external barrier layer of semi-permeable material 41*a* (not visible in FIG. 4; see FIG. 5), which would preferably comprise a polymeric material (such as a silicone rubber), and which will allow the passage (permeation) of gas molecules, but will prevent, or at least inhibit the passage of the larger hydraulic fluid molecules. Therefore, as gas rises within the fluid chamber 21, the gas will readily pass through the barrier layer 41*a*, and into the transfer fabric 43.

Figure 3:
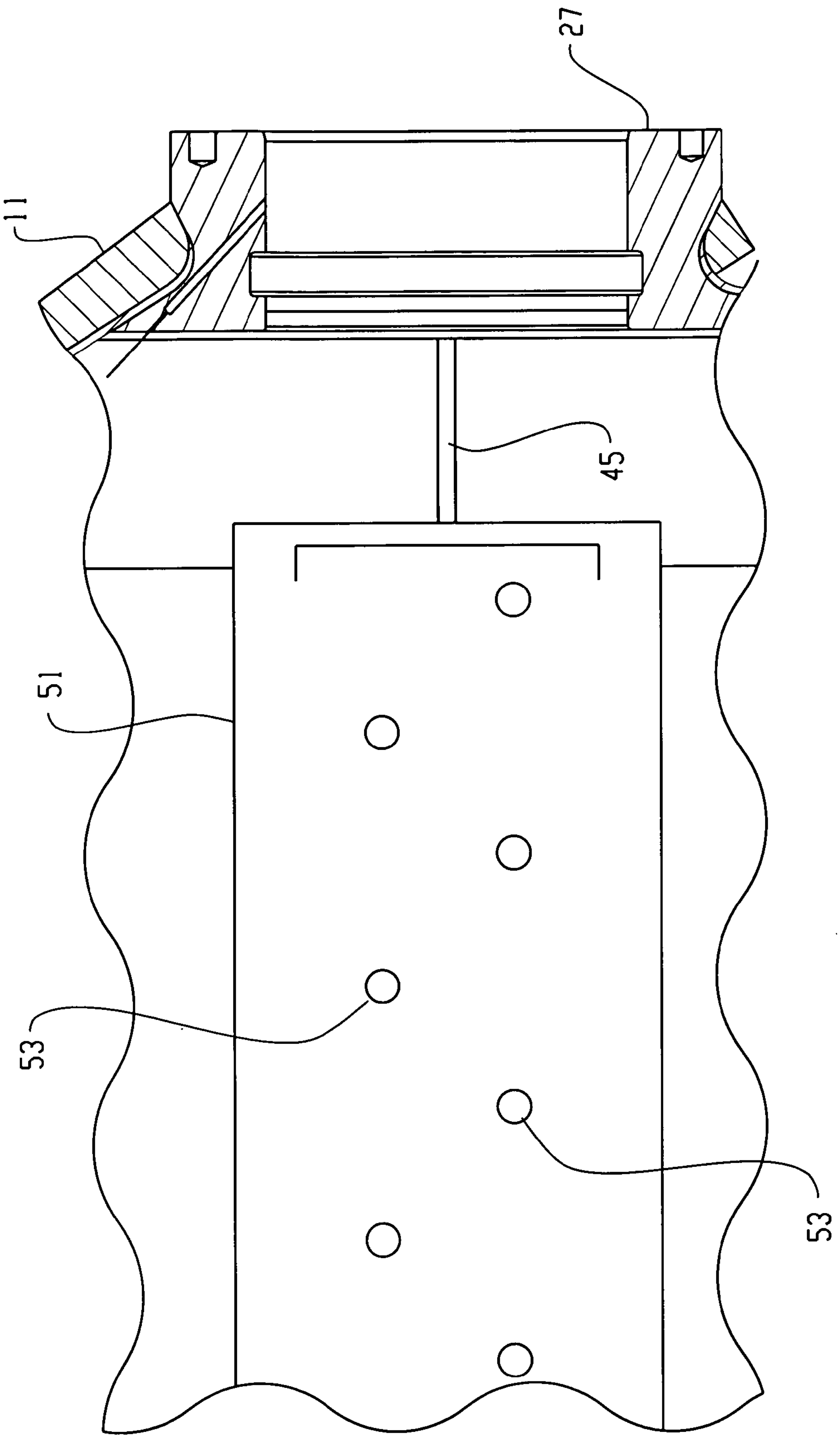
FIG. 3 is an enlarged, fragmentary view, taken in an upward direction in FIG. 2, but on a somewhat smaller scale than FIG. 2, illustrating the gas collection means of the present invention.
Figure 4:
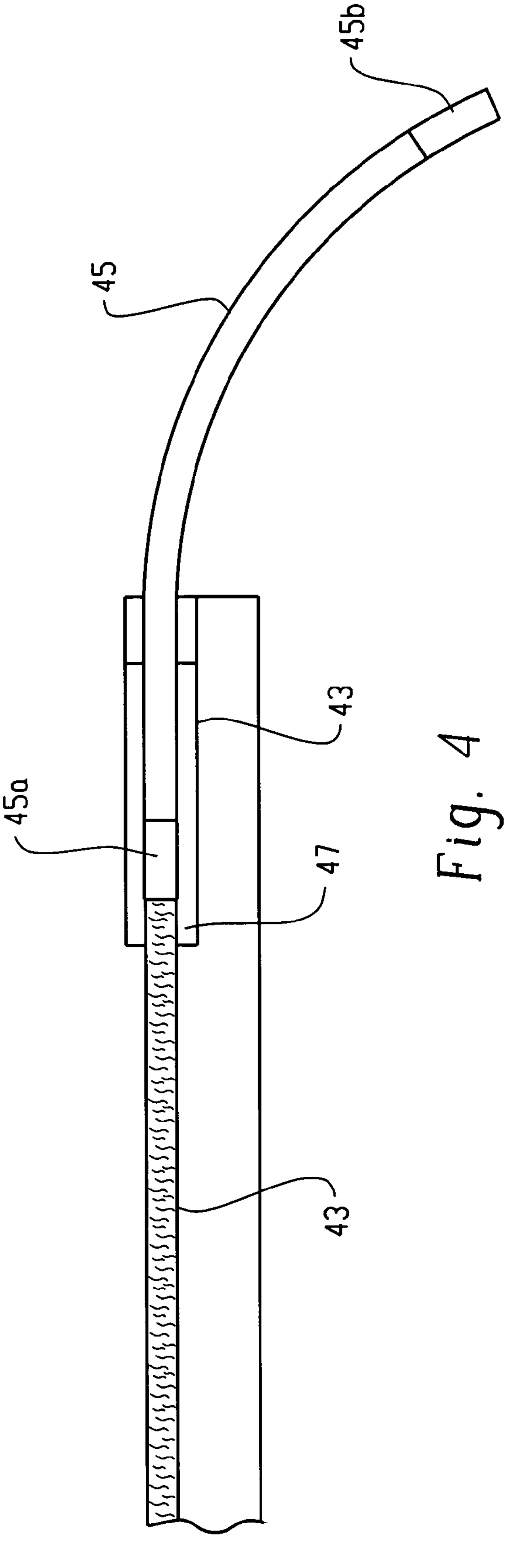
FIG. 4 is a fragmentary view, similar to FIG. 2, and on approximately the same scale, but without showing the accumulator housing, showing in greater detail certain portions of the gas collecting means of the present invention.

At the right end, in FIGS. 2 through 4, of the transfer fabric 43 is a tube member 45, which has one end 45*a* (its left in FIGS. 2 and 4) attached, by any suitable means, such as an adhesive connection 47, to the gas collecting assembly 41. As may best be seen in FIG. 2, while the left end 45*a* of the tube 45 is connected to the transfer fabric 43 of the assembly 41, there is a right end 45*b* of the tube member 45, and the right end 45*b* is received within an angled bore formed in the gas port ring 27, such that the right end 45*b* of the tube member 45 is in open communication with a gas vent passage 49. The gas molecules, which are collected within the transfer fabric 43, are free to migrate through the fabric, and eventually work their way to and through the tube member 45, and out through the vent passage 49. The migration of the gas molecules through the transfer fabric 43, and out the tube member 45 is only slightly assisted by periodic increases in pressure in the fluid chamber 21, squeezing the layer of the transfer fabric 43.

Thus, the transfer fabric 43 and the barrier layer 41*a* together comprise the gas collecting assembly 41, which is also referred to hereinafter in the appended claims as a "means for receiving and collecting gas", and similar terms. The tubular member 45 is also referred to hereinafter in the appended claims as a "conduit means to communicate gas", and similar terms. It may be seen by comparing FIGS. 4 and 5 that the layer of transfer fabric 43 is not necessarily uniform over its entire axial length. As noted previously, the left-hand portion (in FIG. 4) of the transfer fabric 43 is a true layer, but in the region of the left end 45*a* of the tube member 45, the transfer fabric 43 includes an enlarged "transition" region which, in the subject embodiment, appears generally wedge-shaped surrounding the left end 45*a*.

Preferably, and as may best be seen in FIGS. 3 and 5, on the underside of the gas collecting assembly 41 is a structural layer 51. In the subject embodiment, but by way of example only, the structural layer 51 acts as a shield to protect the relatively fragile surface of the gas collecting assembly 41. More specifically, the purpose of the structural layer 51 is to protect the assembly 41 from engagement with the bladder 35, as the bladder moves, while it is expanding or contracting. In the subject embodiment, and by way of example only, the structural layer 51 comprises a relatively stiff plastic member defining a series of holes 53, by means of which hydraulic fluid and gas can pass through the layer 51, and the gas can permeate the assembly 41, as described previously. Alternatively, the structural layer 51 could comprise a fabric member, or a perforated metal member, and it should be understood that the particular details of the layer 51 are not essential features of the invention. As may best be seen in FIG. 5, the opposite edges of the layer 51 are preferably attached (such as by a suitable adhesive) to the surface of the liner 39, thus "enclosing" the gas collecting assembly 41.

Those skilled in the art will understand that the gas vent passage 49 may be connected either to the atmosphere, in situations where it is acceptable for the particular charging gas to be vented to the atmosphere, or to some sort of gas collection arrangement, which would typically be disposed external to the accumulator, and which is beyond the scope of the present invention. What is important to note is that the tube member 45 is shown by way of example only, and all that is essential to the present invention is that there be provided some sort of "conduit means", which simply means some arrangement or structure or whatever by means of which the trapped gas can pass from the transfer fabric 43 to another location.

Figure 6:
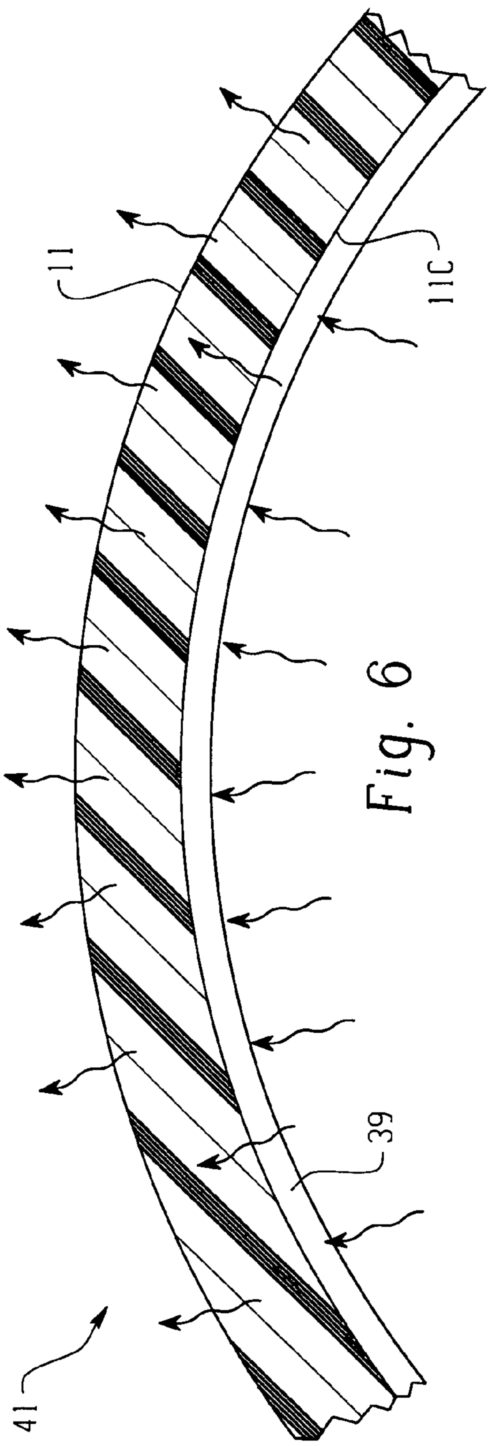
FIG. 6 is a fragmentary, transverse cross-section, similar to FIG. 5, illustrating an alternative embodiment of the present invention.

For example, and now by reference to FIG. 6, the "conduit means" could comprise the housing 11 being formed from a porous filament material, as previously described, in which the polymeric material is selected to have a porosity such that the wall of the housing 11 is semi-permeable with respect to the particular gas being used to charge the accumulator. By "semi-permeable", as used herein, what is meant is that the material permits enough gas to pass through (see arrows in FIG. 6), such that gas does not build up, undesirably, within the fluid chamber 21. At the same time, the housing would not permit (would be impermeable with respect to) the passage of fluid from the fluid chamber 21. It is believed to be within the ability of those skilled in the art of polymers to select the filament wound polymeric material having the desired "semi-permeability" as described above.

Preferably, in the embodiment of FIG. 6, although the assembly 41 of the main embodiment would be eliminated, as would the tube member 45, the liner 39 would still be included to further hinder the passage of fluid through the housing 11. It should be understood that terms such as "means for receiving and collecting gas" apply to any of the embodiments shown herein, even though the end result may be that the gas merely escapes from the accumulator, and is not literally "collected", in the sense of being capable of thereafter being communicated to a particular location.

Alternatively with respect to the embodiment of FIG. 6, the gas collecting assembly 41 may comprise a single layer of a semi-permeable material bonded to the liner 39, and bridging a gap, or a series of gaps, in the liner 39. Therefore, in this embodiment, gas which has passed from the liquid in the fluid chamber 21 through the semi-permeable material may then continue through the gaps in the liner 39, and then penetrate (permeate) the porous molecular structure of the composite windings of the housing 11. Eventually, this gas will emerge from the housing 11 as free molecular gas, and pass into the environment. It is believed to be within the ability of those skilled in the art to select the number and size of the openings or gaps in the liner 39 so as not to create significant resistance to the movement of gas molecules through the liner 39. In accordance with this alternative embodiment, the tube member 45 and the gas vent passage 49 are not required elements of the invention, and instead, the porous passages through the housing 11 comprise the "conduit means" of the appended claims.

As a further alternative embodiment, the gas collecting assembly may comprise a single component, in the form of a semi-permeable material being used as the material for the liner 39, at least over some portion of the "top" inside surface of the housing 11, i.e., the portion wherein the assembly 41 of the main embodiment resides. For example, in this embodiment, the liner 39 (or a local portion thereof) could comprise the same material as would be used for the semi-permeable material 41*a* in the primary embodiment. In accordance with this alternative embodiment, the tube member 45 and the gas vent passage 49 are again not required elements of the invention, and instead, that portion of the liner comprises the "means for receiving and collecting gas" for purposes of the appended claims, and the porous passages through the liner 39 and through the housing 11 comprise the "conduit means" of the appended claims.

Figure 7:
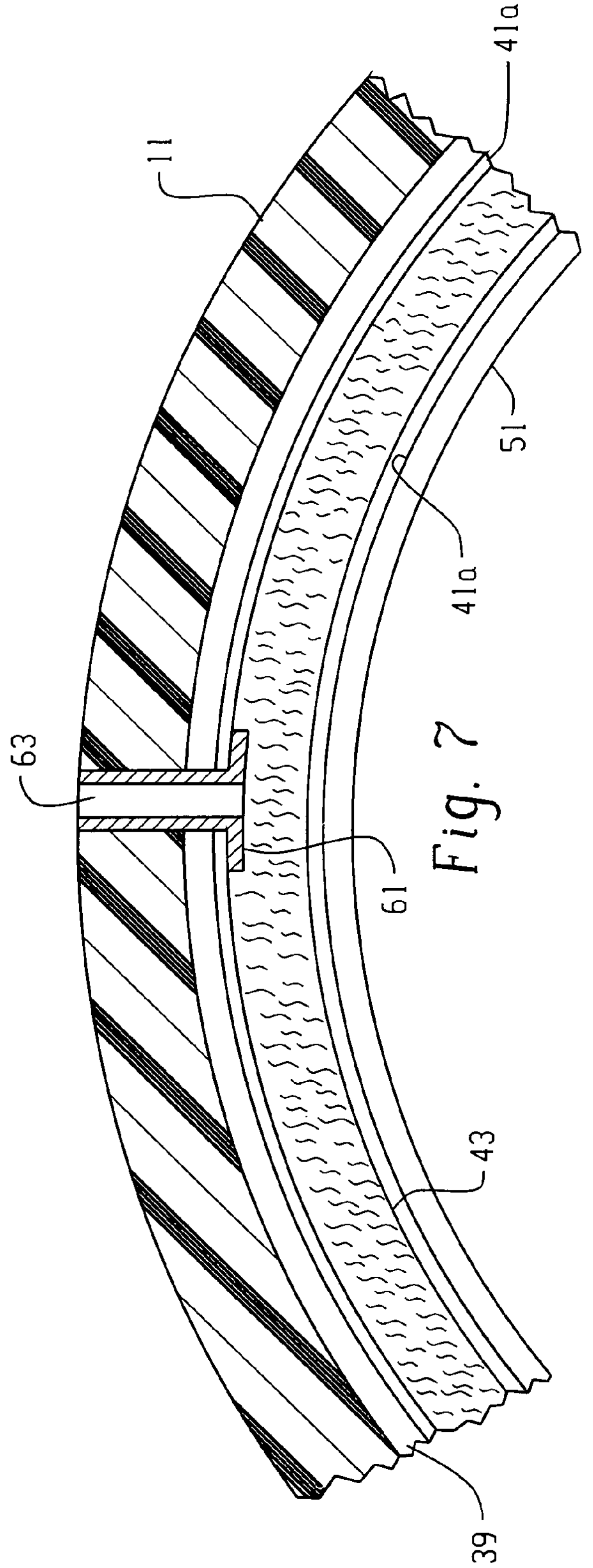
FIG. 7 is a further enlarged, fragmentary, transverse cross-section, similar to FIG. 5, illustrating another alternative embodiment of the present invention.

As a example of a slightly different embodiment, and with reference now to FIG. 7, the tube member 45 could be replaced by a radially oriented tubular fitting 61 defining a radial passage 63 through which trapped gas would escape radially from the transfer fabric 43. The fitting 61 could be formed of plastic or metal or any other suitable material, and would preferably be configured such that it would be retained, as shown, against an inner surface of the semi-permeable material 41*a*. In the embodiment of FIG. 7, but by way of example only, the primary difference from the main embodiment is the replacement of the tube member 45 with the fitting 61, thus overcoming any potential problems associated with flexing and wear of the tube member 45, and the extra expense of providing and assembling the tube member 45. Also, it should be apparent that, if desired, several of the fittings 61 could be provided at various locations around or along the housing 11, and it is believed to be within the ability of those skilled in the art, based upon a reading and understanding of this specification, to select the number and locations of the fittings 61.

Although the present invention has been illustrated and described in connection with an embodiment in which the gas chamber 33 is surrounded by the liquid chamber 21, it should be understood that the present invention is not so limited. Instead, the bladder 35 could contain the liquid, and be surrounded by the gas chamber, in which case, the gas collecting assembly 41 would be disposed within the bladder 35 (and probably disposed toward the "top" thereof), and surrounded by the hydraulic fluid. In this embodiment, which is within the scope of the appended claims, unless otherwise specifically noted, the gas which permeates the bladder 35 would pass through the hydraulic fluid and be received by and collected within the assembly 41, and then communicated to the exterior of the accumulator, as described previously.

Figure 8:
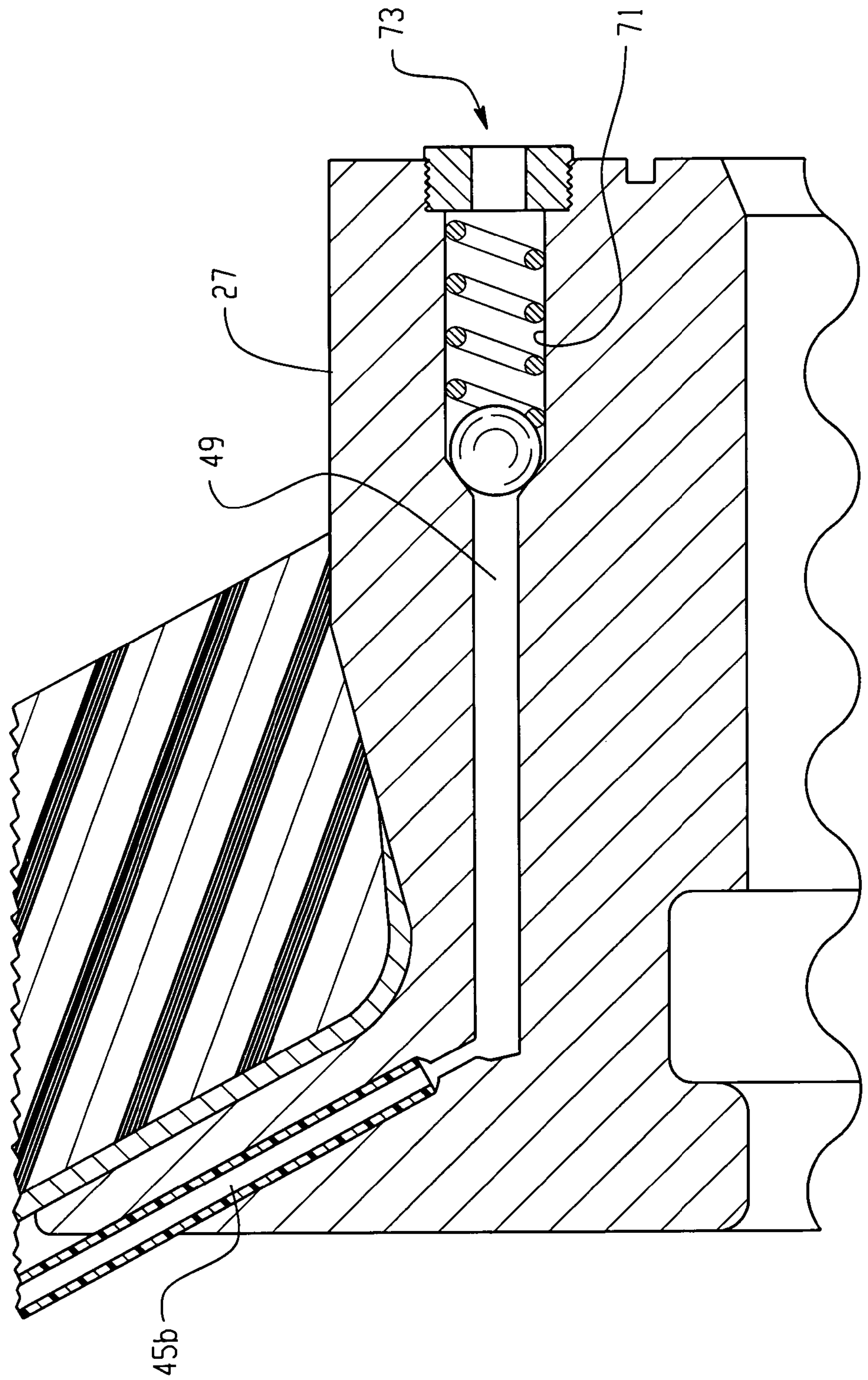
FIG. 8 is an enlarged, fragmentary, axial cross-section, similar to FIG. 2, illustrating a further embodiment of that aspect of the present invention.

Referring now briefly to FIG. 8, there is shown an alternative version of the main embodiment, simply to illustrate one possible aspect of the invention which may need to be addressed. In FIG. 8, the gas vent passage 49, rather than being fairly small in cross-section over its entire length as in FIG. 2, includes an enlarged passage portion 71. Disposed within the passage portion 71 is a check valve assembly 73, the details of which form no part of the invention. The check valve assembly 73 is included merely to illustrate and explain that it may be necessary, in implementing the present invention, to provide suitable structure so that trapped gas can escape, but air from outside the accumulator cannot freely enter and mix with the charging gas or with the fluid in the fluid chamber 21.

Figure 9:
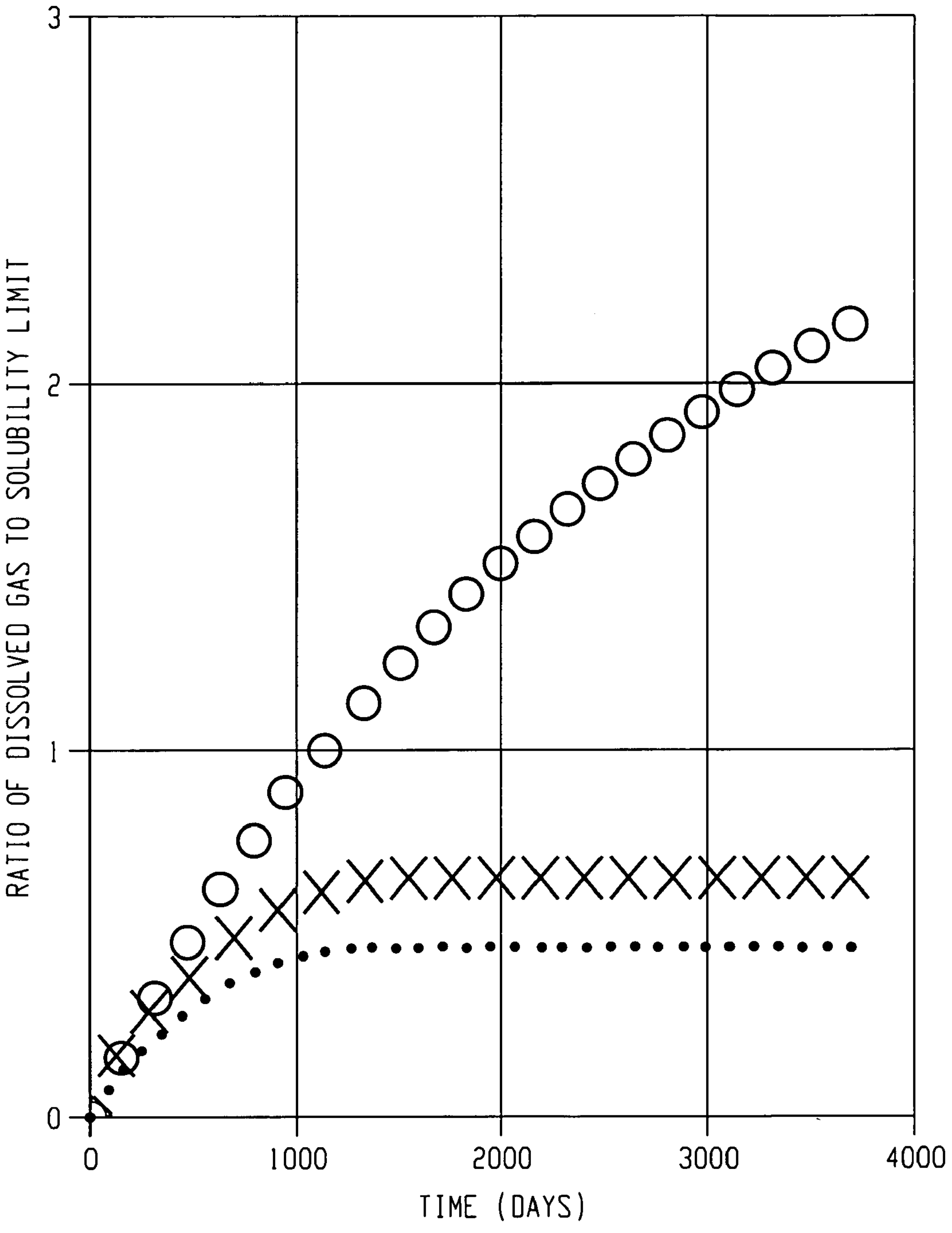
FIG. 9 is a graph of the Ratio (of dissolved gas to the solubility limit) as a function of Time in days, comparing the present invention to an accumulator not having the present invention.

Referring now to the graph of FIG. 9, there is presented a comparison of the present invention (graph comprising XXX's) versus an accumulator without the invention (graph comprising OOO's). In each case, the ordinate is the Ratio of dissolved gas to the solubility limit (i.e., for that particular gas within the fluid being used). In the graph of FIG. 9, the numbers relate to reaching the saturation limit of nitrogen in oil at 60 psig., and at room temperature. As will be understood by those skilled in the art, it is desirable for the ratio to always remain below "1.0" to avoid a build-up of gas within the fluid. By way of example, in a mathematical analysis of an accumulator of a particular size, with and without the invention, it has been determined that, without the invention, the Ratio would rise above "1.0" within what may be considered a fairly short time (a little over 1000 days) in certain applications, whereas, with the invention, the Ratio would level off as shown, and remain well below "1.0" for what apparently would be an indefinite time.

The invention has been described in great detail in the foregoing specification, and it is believed that various alterations and modifications of the invention will become apparent to those skilled in the art from a reading and understanding of the specification. It is intended that all such alterations and modifications are included in the invention, insofar as they come within the scope of the appended claims.

What is claimed is:

1. A hydraulic accumulator of the liquid-gas type, comprising a rigid housing defining an internal chamber and a gas port and a liquid port; a gas charging valve disposed in said gas port to control the admission of high pressure gas; a deformable, semi-permeable separator disposed within said housing to separate said internal chamber into a gas chamber in communication with said gas port, and a liquid chamber in communication with said liquid port; characterized by:

(a) means disposed within said liquid chamber for receiving and collecting gas which passes from said gas chamber, through said semi-permeable separator, into said liquid chamber; and (b) conduit means having one end in fluid communication with said gas collecting means, and another end operably associated with said housing to communicate gas from said gas collecting means out of said liquid chamber.

2. A hydraulic accumulator as claimed in claim 1, characterized by said rigid housing is generally cylindrical and horizontally elongated, said gas port being disposed at one axial end of said housing, and said liquid port being disposed at the other axial end of said housing.

3. A hydraulic accumulator as claimed in claim 2, characterized by said semi-permeable separator comprising an elongated, generally cylindrical, elastically-deformable bladder defining therein said gas chamber, and having one end thereof fixed relative to said rigid housing adjacent said gas charging valve.

4. A hydraulic accumulator as claimed in claim 3, characterized by said generally cylindrical bladder being generally centrally disposed within said internal chamber defined by said rigid housing; said bladder being surrounded by said liquid chamber under most operating conditions of said accumulator.

5. A hydraulic accumulator as claimed in claim 4, characterized by said gas collecting means being elongated, and extending axially over at least a major portion of the axial length of said internal chamber, and being disposed above said bladder when said accumulator is in its operational position.

6. A hydraulic accumulator as claimed in claim 1, characterized by said means for receiving and collecting gas comprises a transfer membrane including a gas transfer portion through which gas can travel when said transfer membrane is subjected to normal operating pressures in said liquid chamber.

7. A hydraulic accumulator as claimed in claim 6, characterized by said transfer membrane includes a layer of material which is generally permeable to said gas in said gas chamber, while being generally impermeable to liquid, said layer of material being disposed between said gas chamber and said gas transfer portion of said transfer membrane.

8. A hydraulic accumulator as claimed in claim 1, characterized by said conduit means comprises a tube member having one end in communication with said gas collecting means and another end in communication with said housing, said tube member extending generally axially from said one end to said another end.

9. A hydraulic accumulator as claimed in claim 1, characterized by said conduit means comprises at least one radially-extending fitting, said fitting being disposed within a wall of said housing, and having its radially inner end in communication with said gas collecting means, and a radially outer end in open communication with the exterior of said accumulator.

10. A hydraulic accumulator of the liquid-gas type, comprising a rigid housing defining an internal chamber and a gas port and a liquid port; a gas charging valve disposed in said gas port to control the admission of high pressure gas; a deformable, semi-permeable separator disposed within said housing to separate said internal chamber into a gas chamber in communication with said gas port, and a liquid chamber in communication with said liquid port; characterized by:

(a) means disposed within said liquid chamber for receiving and collecting gas which passes from said gas chamber, through said semi-permeable separator, into said liquid chamber, said means comprising said rigid housing having disposed therein a liner, including at least a portion of which is semi-permeable with respect to said gas; and (b) conduit means having one end in fluid communication with said gas collecting means, and another portion operably associated with said housing to communicate gas from said gas collecting means, said conduit means comprising said rigid housing being formed from a porous filament material which is semi-permeable with respect to said gas.

11. A hydraulic accumulator as claimed in claim 10, characterized by said liner comprising a material which is substantially impermeable with respect to said liquid, but generally permeable with respect to said gas.

12. A hydraulic accumulator as claimed in claim 10, characterized by said porous filament material being selected such that the ratio of the dissolved gas within the liquid chamber to the solubility limit of said gas within said liquid remains below 1.0 during the normal operating life of the accumulator.

* * * * *